United States Patent [19]
Fairhurst

[11] Patent Number: 5,231,478
[45] Date of Patent: Jul. 27, 1993

[54] ADAPTIVE CONTROL SIGNAL GENERATOR FOR AN ADAPTIVE LUMINANCE/CHROMINANCE SEPARATOR

[75] Inventor: Jon A. Fairhurst, Grass Valley, Calif.

[73] Assignee: The Grass Valley Group, Inc., Nevada City, Calif.

[21] Appl. No.: 813,537

[22] Filed: Dec. 26, 1991

[51] Int. Cl.$^5$ .............................................. H04N 9/78
[52] U.S. Cl. ........................................ 358/31; 358/27
[58] Field of Search ................................... 358/31, 27

[56] References Cited

U.S. PATENT DOCUMENTS

| | | | |
|---|---|---|---|
| 4,088,080 | 8/1987 | Wagner | 358/31 |
| 4,703,342 | 10/1987 | Takahashi | 358/31 |
| 4,920,408 | 4/1990 | Umezawa | 358/31 |
| 4,933,748 | 6/1990 | Katsuki et al. | 358/11 |
| 4,985,757 | 1/1991 | Yasuki et al. | 358/31 |
| 4,992,856 | 2/1991 | Robinson | 358/31 |
| 4,994,906 | 2/1991 | Moriwake | 358/31 |
| 5,019,895 | 5/1991 | Yamamoto | 358/36 |

FOREIGN PATENT DOCUMENTS

| | | |
|---|---|---|
| 0426426 | 5/1991 | European Pat. Off. . |
| 014490 | 6/1988 | Japan . |

*Primary Examiner*—John K. Peng
*Assistant Examiner*—Jeffrey S. Murrell
*Attorney, Agent, or Firm*—John Smith-Hill; Francis I. Gray

[57] ABSTRACT

An apparatus and method for producing improved adaptive control signals for a luminance and chrominance separation circuit employing adaptive filtering of a chrominance signal includes a vertical difference detector, a horizontal difference detector, and a combiner. The vertical difference detector contains upper difference detector and lower difference detector, each of which receives a horizontally filtered next line signal ($L_N$), a horizontally filtered present line signal ($L_P$), and a horizontally filtered last line signal ($L_L$), and which produce, respectively, an upper difference signal and a lower difference signal. In a preferred embodiment, the lower and upper difference detectors implement, respectively, the expressions $|2L_L+L_P-L_N|$ and $|2L_N+L_P-L_L|$. The vertical detector also contains a larger valve selector that receives the upper and lower difference signals and produces a vertical chrominance difference signal that is based on, and preferably is the larger of the upper and lower difference signals. The horizontal difference detector receives the present line signal and determines the absolute value of the sum of the values of two pixels that are separated by an integral number of half cycles of a subcarrier frequency to produce a horizontal chrominance difference signal. The combiner contains a subtracter for subtracting the horizontal chrominance difference signal from the vertical chrominance difference signal to produce an adaptive control signal, and may further include a scaler on the subtracter input and a divide-by-two circuit and/or a limiter on the subtracter output.

21 Claims, 3 Drawing Sheets

$$\rightarrow \boxed{\begin{array}{|c|c|c|c|c|} \text{Y}-\text{I} & \text{Y}-\text{Q} & \text{Y}+\text{I} & \text{Y}+\text{Q} & \text{Y}-\text{I} \\ \hline -\frac{1}{4} & 0 & \frac{1}{2} & 0 & -\frac{1}{4} \end{array}} \rightarrow \text{I}$$

Fig. 3
(PRIOR ART)

$$L_L \rightarrow \boxed{-\frac{1}{4}}\ Y_R-I$$
$$L_P \rightarrow \boxed{\frac{1}{2}}\ Y_R+I \rightarrow I$$
$$L_N \rightarrow \boxed{-\frac{1}{4}}\ Y_R-I$$

Fig. 4
(PRIOR ART)

ADAPTIVE CONTROL SIGNAL GENERATOR FOR AN ADAPTIVE LUMINANCE/CHROMINANCE SEPARATOR

BACKGROUND OF THE INVENTION

This invention relates to the separation of the luminance and chrominance components of a composite quadrature modulated color television signal, and more particularly to improved control of adaptive filtering to perform such a separation.

FIG. 1 is a graph of the frequency spectrum occupied by a typical quadrature modulated color television picture signal in accordance with the NTSC format. As is shown, luminance and chrominance information share the same spectrum. The luminance bandwidth is typically limited to 4.2 MHz, the I component bandwidth is typically limited to 1.3 MHz, and the Q component bandwidth is typically limited to 0.6 MHz. The I and Q components are present as carrier suppressed amplitude modulation components in phase quadrature upon a subcarrier at about 3.58 MHz. In the composite video signal this quadrature modulated subcarrier is added to the luminance carrier, and the resultant composite video signal is low pass filtered to 4.2 MHz.

The simplest means of separating the luminance and chrominance components of such a composite video signal is to apply the composite signal to a bandpass filter tuned to the subcarrier frequency, so that the chrominance signal is produced at the output of that filter. The chrominance signal can then be subtracted from the composite signal to produce the luminance signal. While this type of bandpass filter is inexpensive to build, especially in analog systems, it produces imperfect separation of the luminance and chrominance components. Luminance components that are in the chrominance band are interpreted as color, causing cross-color patterns that are typically perceived as a moving rainbow accompanying luminance transitions, or as other inappropriate color activity in the proximity of luminance details. Conversely, certain chrominance components are also interpreted as luminance, producing "dot-crawl" artifacts in the vicinity of the color transitions.

As will be further described in detail below, digital comb filters have been employed to produce more effective separation of the carrier and subcarrier contents. Filtering can be performed along the horizontal and vertical axes sequentially, to produce a chrominance signal that displays subcarrier activity along both of those axes. A more sophisticated filtering scheme for separating luminance and chrominance utilizes "adaptive" filtering to select either horizontal filtering only or filtering along both the horizontal and vertical axes.

FIG. 2 is a block diagram of a luma/chroma separation circuit that utilizes an adaptive filtering scheme. This circuit is typically used in a decoder, such as a decoder used in a studio setting. In this circuit the composite video signal input is applied to the input of a horizontal filter 12 and to delay element 8, the output of which is applied to the positive input of a summation circuit 10. The horizontal filter 12 is a bandpass filter centered around the subcarrier frequency.

Referring to FIG. 3, in its simplest form the horizontal filter 12 produces the weighted average of the composite video data associated with five consecutive pixels of the color video image. The clock signals associated with the television raster occur at four times the subcarrier frequency and the two orthogonal chrominance components are interleaved. Thus, in video according to the NTSC standard where the two video components are I and Q, a series of four pixels contains first a positive chrominance component of one type, e.g., +I, then a positive chrominance component of the other type, e.g., +Q, and then a pair of negative samples in the same sequence, i.e., −I followed by −Q. There also is a phase difference between successive lines of video, so that a two line sequence contains the following pattern of luminance and chrominance components:

$$Y+I \quad Y+Q \quad Y-I \quad Y-Q$$
$$Y-I \quad Y-Q \quad Y+I \quad Y+I$$

Thus, in the horizontal filter 12 shown in FIG. 3, only the pixel values corresponding to one chrominance component have non-zero coefficients; with the alternate pixels having zeros as their coefficients. In this example, the chrominance component that is currently being processed is the I component. One clock cycle later (with clocks occurring at four times the subcarrier frequency), the data will have advanced to the right and the filter will be processing the Q component instead. Because the smaller coefficients of the stages at the ends of the horizontal filter 12 have the opposite sign from the stage in the middle stage with the larger coefficient, the filter cancels out the luminance content (Y) of the composite signal, while it constructively adds the chrominance component that is currently being processed.

While this simple version of the horizontal filter has a less than ideal frequency response and produces some blurring of the chrominance detail, more complex versions of the filter can be constructed that have more stages and smaller coefficients, so that they operate according to the same general principles, but produce an output that has a more nearly ideal frequency response.

Referring again to FIG. 2, the output of the horizontal filter 12 is applied to a first line delay 14, to a first input of an adaptive control circuit 20, and to a first input of a vertical filter 18. The vertical filter 18 is also effectively a bandpass filter at the subcarrier frequency. The output of the first line delay 14 is applied to a second input of the vertical filter 18, to a second input of the adaptive control circuit 20, to the input of a second line delay 16, and to another delay 22 representing the delay associated with the vertical filter 18. The output of the second line delay 16 is applied to a third input of the vertical filter 18 and to a third input of the adaptive control circuit 20. The output of delay 22, which is the horizontally (only) filtered chrominance signal $C_H$, is applied to a first input of a mixer 24, and the output of the vertical filter 18, which is a chrominance signal $C_{VH}$ that has been filtered both vertically and horizontally, is applied to a second input of the mixer 24. The mixer 24 is controlled by an output of the adaptive control circuitry 20 and produces a chrominance signal that is subtracted from the composite video input by summation circuit 10 to produce a luminance output.

Referring now to FIG. 4, the vertical filter 18 receives the same pixel of three consecutive lines, a last line $L_L$, a present line $L_P$, and a next line $L_N$, and produces their weighted average according to the coefficients of the three stages. As with the horizontal filter 12, the opposite signs of the coefficients associated with the first and last stages of the vertical filter 18 cause any residual luminance $Y_R$ to be canceled out, while the chrominance components add constructively. And, as with the horizontal filter 12, the output alternates between I and Q chrominance components. And again, as with the horizontal filter 12, a more complicated version of the vertical filter 18 with more stages and more complex coefficients would produce a more nearly ideal frequency response.

In the circuit shown in FIG. 2 the adaptive control circuitry 20 makes a determination of how to control the mixer 24 based on the relationship between the output of the horizontal filter 12 over the same three consecutive lines that are inputs to the vertical filter 18. According to this control signal, the adaptive control circuit 20 and the mixer 24 select either a signal that has only been horizontally filtered 12 or one that has been both horizontally 12 and vertically 18 filtered. If the adaptive control signal is a single bit, this selection is between all one input or all the other. If the adaptive control signal contains multiple bits or is a linear analog signal, the selection can be various combinations of partly one input and partly the other.

SUMMARY OF THE INVENTION

The present invention is an improved method and apparatus for generating a multi-bit adaptive control signal. In accordance with the invention, there is provided an apparatus and corresponding method for producing improved adaptive control signals for a luminance and chrominance separation circuit employing adaptive filtering of a chrominance signal. The apparatus includes a vertical difference detector and a horizontal difference detector and a combining means. The vertical difference detector contains an upper difference detector and a lower difference detector each of which receive a next line signal ($L_N$), a present line signal ($L_P$), and a last line signal ($L_L$), and which produce, respectively, an upper difference signal and a lower difference signal. In a preferred embodiment, the lower and upper difference detectors implement, respectively, the expressions $|2L_L+L_P-L_N|$ and $|2L_N+L_P-L_L|$. The vertical difference detector also contains a comparison means that receives the upper and lower difference signals and produces a vertical chrominance difference signal that is based on, and preferably is the larger of the upper and lower difference signals. The horizontal difference detector receives the present line signal and contains means for determining the absolute value of the sum of the values of two pixels that are separated by an integral number of cycles of a subcarrier frequency to produce a horizontal chrominance difference signal. The combining means contains a subtracter for subtracting the horizontal chrominance difference signal from the vertical chrominance difference signal to produce a multi-bit adaptive control signal, and may further include scaling means on the subtracter input and a divide-by-two circuit and/or a limiter on the subtracter output.

BRIEF DESCRIPTION OF THE DRAWINGS

For a better understanding of the invention, and to show how it may be carried into effect, further reference will be made, by way of example, to the accompanying drawings in which:

FIG. 3 is a conceptual diagram of a horizontal comb filter;

FIG. 4 is a conceptual diagram of a vertical comb filter; and

In the different figures of the drawings, like reference numerals designate like components, and primed reference numerals designate components that have similar functions to those designated by the corresponding unprimed reference numerals.

DETAILED DESCRIPTION

Figure 5:
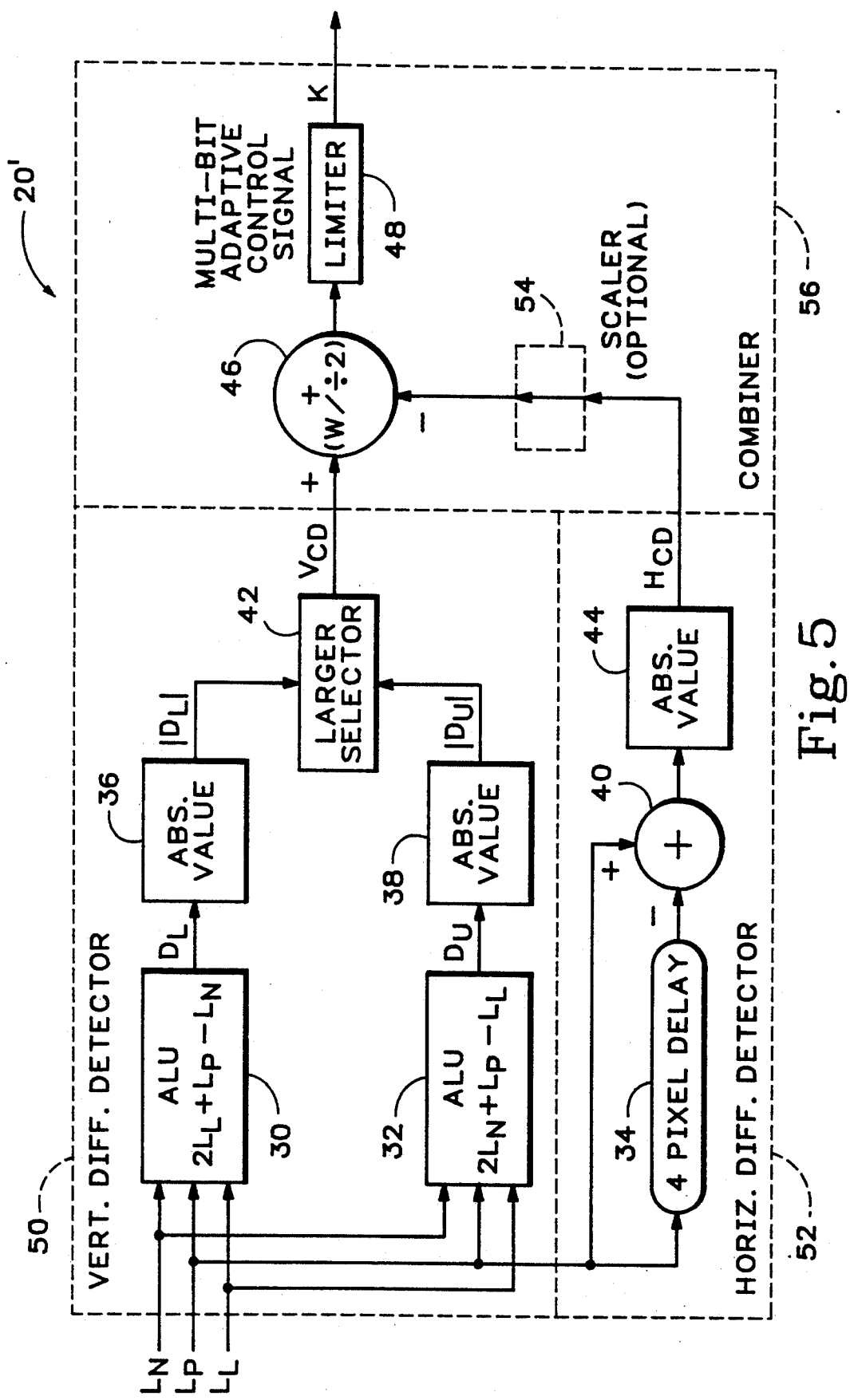
FIG. 5 is an improved adaptive control circuit according to the present invention.

An improved adaptive control circuit 20' according to the present invention is shown in FIG. 5. This circuit receives as inputs the output of the horizontal filter 12, a next line signal $L_N$, the output of the first line delay 14, a present line signal $L_P$, and the output of the second line delay 16, a last line signal $L_L$. All three of these inputs are applied to a first arithmetic logic unit (ALU) 30 and a second arithmetic logic unit 32 within a vertical difference detector 50. The present line signal $L_P$ is also applied to the input of a 4-pixel delay element 34 within a horizontal difference detector 52.

The first 30 and second 32 ALUs implement the functions shown in equations (1) and (2), respectively:

$$D_L = 2^*L_L + L_P - L_N \qquad (1)$$

$$D_U = 2^*L_N + L_P - L_L \qquad (2)$$

The output of the first ALU 30, $D_L$, represents vertical activity in the chrominance band with an emphasis on the last line, while the output of the second ALU 32, $D_U$, represents vertical activity in the chrominance band with an emphasis on the next line. Either of these signals, $D_L$ and $D_U$, can have a positive or negative value, but they are applied to absolute value circuits 36 and 38, respectively, to convert them to unsigned magnitudes $|D_L|$ and $|D_U|$, respectively. The unsigned magnitudes $|D_L|$ and $|D_U|$ are applied to the inputs of larger selector circuit 42 which produces the larger of them as its output and the output of the overall vertical difference detector 50, the vertical chrominance difference signal, $V_{CD}$.

The present line signal $L_P$ and the delayed version of it from 4-pixel delay element 34 are applied to the plus and minus inputs, respectively, of summation circuit 40. The output of the summation circuit 40 is applied to absolute value circuit 44, which produces a horizontal chrominance difference signal, $H_{CD}$, as its output, which is the output of the overall horizontal difference detector 52. A delay of four pixels corresponds to 360° of phase rotation of the subcarrier, so that the same chrominance components with the same sign are being compared. Alternatively, a two pixel delay could be used and the delayed value added to the present value instead of subtracted from it. Either way, the horizontal difference detector 52 detects horizontal changes in chrominance, i.e., vertical lines or edges.

The vertical chrominance difference signal, $V_{CD}$, and the horizontal chrominance difference signal, $H_{CD}$, are both applied to the inputs of combiner 56, which in this embodiment is summation circuit 46 and limiter 48.

Summation circuit 46 includes a divide-by-two function on its output. Summation circuit 46 subtracts the horizontal chrominance difference signal $H_{CD}$ from the vertical chrominance difference signal $V_{CD}$ and divides the result by two to produce its output. The output of summation circuit 46 is applied to limiter 48, which limits that output to values within the range of 0 to 1. The output of limiter 48 is the multi-bit adaptive control signal K. The divide-by-two function would be sufficient to limit the output to this range if the inputs were all known in advance to be limited to the range of 0 to 1, but since that is an unrealistic constraint, the use of limiter 48 is preferred. In alternative embodiments, $H_{CD}$ and $V_{CD}$ might be scaled separately, for example with scaler 54, before being applied to the inputs of summation circuit 46 to achieve moderately different effects in the control of cross-color and cross-luminance artifacts. Also, the summation circuit 46 might be replaced with an ALU to perform a different mathematical function.

Obviously the delays through the vertical difference detector 50 and the horizontal difference detector 52 must be adjusted so that the values of the vertical chrominance difference signal and the values of the horizontal chrominance difference signal refer to the same pixel location on the present line when they reach the summation circuit 46. Means for producing such equivalent delays are well known to those skilled in the art.

Figure 1:
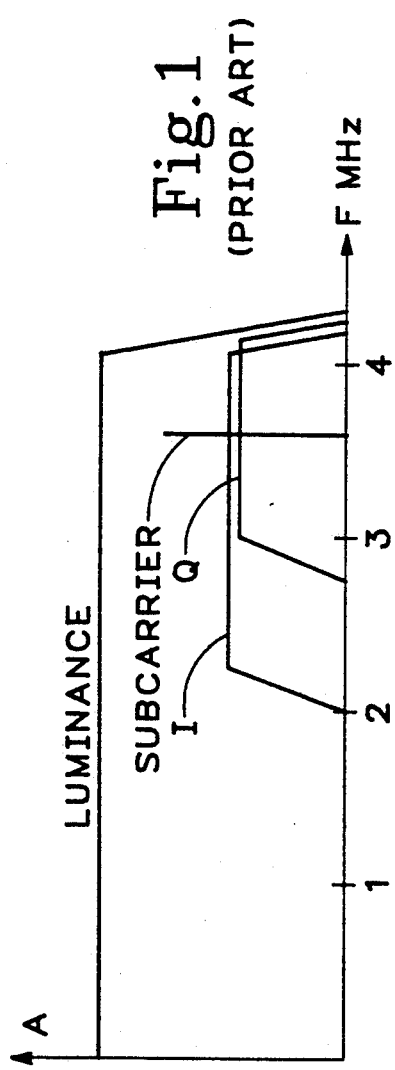
FIG. 1 is a graph of the frequency spectrum occupied by a typical quadrature modulated color television picture signal in accordance with the NTSC format.
Figure 2:
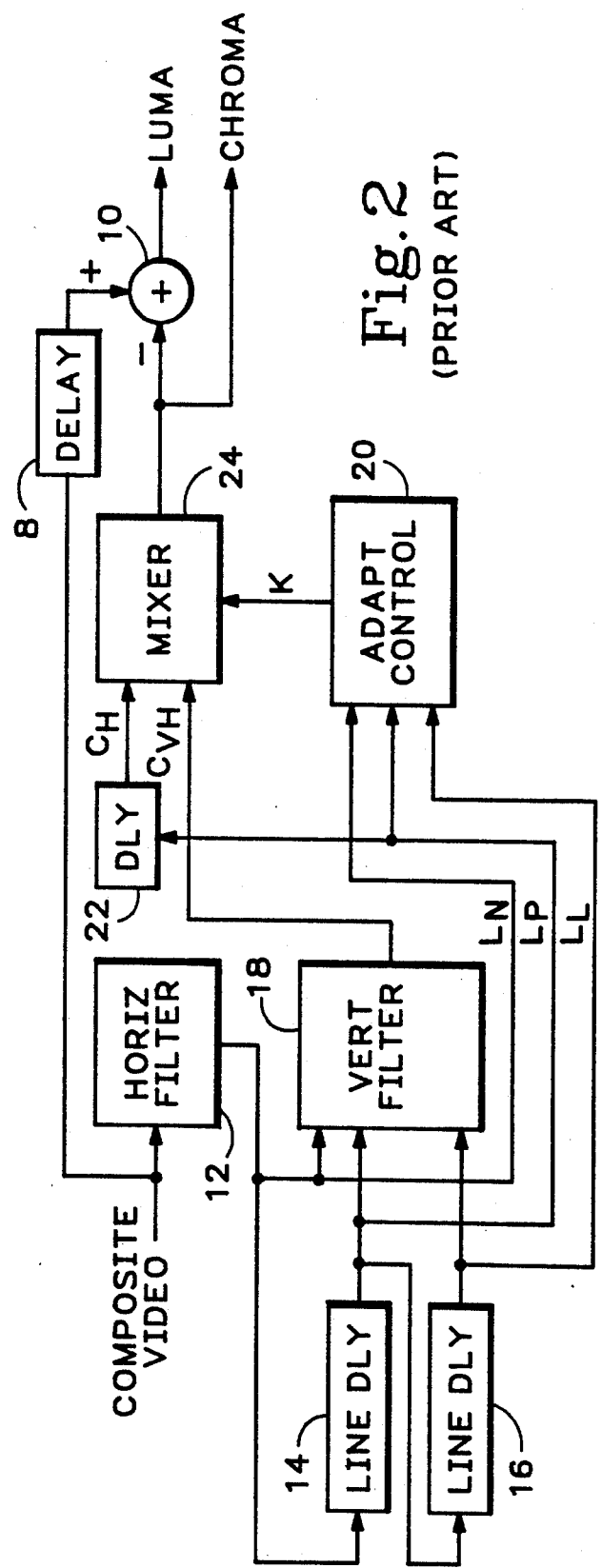
FIG. 2 is a block diagram of a luma/chroma separation circuit that utilizes adaptive filtering.

Referring again to FIG. 2, the multi-bit adaptive control signal K is used to control the mixer 24 output according to the standard mix equation (3):

$$CHROMA_{OUT} = K^*C_H + (1-K)^*C_{VH} \quad (3)$$

Since exact control of the mixing function is not critical the output of limiter 48 can be four, five, or six bits in length. Less than four bits give the resulting video image a noisy appearance, but more than six bits are beyond the point of diminishing returns.

The vertical difference detector 50 produces its largest output when the data applied to it represent a major change in chrominance values along the vertical axis of the image. For example, if $L_N = -1$, $L_P = +1$, and $L_L = 0$, this means that the apparent magnitude of the chrominance signal changed from one to zero between the present line and the next line, bearing in mind that $+1$ and $-1$ are the same value after the phase reversal. Such a change might mean that the saturation has dropped from maximum to zero, or that the hue changed by 90° in one direction or the other, or that a combination of hue and saturation changes happened to result in this dramatic change. Putting the values of this example into equations (1) and (2) yields:

$$D_L = 2^*(0) + (1) - (-1) = 2 \quad (1.1)$$

$$D_U = 2^*(-1) + (1) - (0) = -1 \quad (2.1)$$

When the larger of the absolute values of these results is selected by the larger selector circuit 42, the value of the resulting vertical chrominance difference signal is two, i.e., $V_{CD} = 2$. If we assume that there was no horizontal chrominance change, and that therefore the value of the horizontal chrominance difference signal was zero, i.e., $H_{CD} = 0$, then the output of the summation circuit 46, with its included divide-by-two function, is one, as is the output of limiter 48, and hence $K = 1$. Putting this value for K into equation (3) shows that the horizontally filtered only chrominance signal, $C_H$, is 100% selected for this case:

$$CHROMA_{OUT} = (1)^*C_H + (1-1)^*C_{VH} = C_H \quad (3.1)$$

Selecting entirely the horizontally filtered only chrominance signal and none of the chrominance signal that has been filtered in both dimensions is desirable in these circumstances, since this maximizes the chrominance signal in this location and thereby minimizes the luminance signal, resulting in the virtual elimination of the dot-crawl artifacts that would otherwise occur.

We next consider how this adaptive control circuit 20 responds to a single horizontal line of chrominance detail against a colorless background. We assume that this line is located on the present line, $L_P$, so that:

$$D_L = 2^*(0) + (1) - (0) = 1 \quad (1.2)$$

$$D_U = 2^*(0) + (1) - (0) = 1 \quad (2.2)$$

When the larger of the absolute values of these results is selected by the larger selector circuit 42, the value of the resulting vertical chrominance difference signal is one, i.e., $V_{CD} = 1$. If we again assume that there was no horizontal chrominance change, and that therefore the value of the horizontal chrominance difference signal was zero, i.e., $H_{CD} = 0$, then the output of the summation circuit 46, with its included divide-by-two function, is one half, as is the output of limiter 48, and hence $K = 0.5$. This causes the mixer 24 output to be half $C_H$ and half $C_{VH}$. Thus, for this single line case, the chrominance is partially increased and the luminance is correspondingly decreased. This result is also obtained when $L_N = 1$, $L_P = 0$, and $L_L = 1$.

This partial response is desirable for chrominance that alternates on every other line, since responding to the detection of alternating horizontal chrominance lines too strongly would degrade the picture quality. This is because vertical luminance lines varying at the subcarrier frequency appear identical to alternating horizontal chrominance lines, so an intermediate response is appropriate to either possibility.

Because the signal from the horizontal difference detector 52, $H_{CD}$, is subtracted from the signal from the vertical difference detector, the presence of diagonal lines leads to a low value for K, the mixer control signal. A low K under these circumstances is desirable because it leads to a diminished chrominance signal and a larger luminance signal, and even though this leads to some dot-crawl artifacts, experience has shown that this is usually preferable to losing picture detail.

When the output of the horizontal difference detector 52 exceeds the output of the vertical difference detector 50, $K = 0$ and the chrominance output is all derived from the output of the vertical filter 18, $C_{VH}$. Since horizontal activity at the subcarrier frequency is presumed to be chrominance but might contain some luminance, the output chrominance signal under these circumstances should be filtered along both dimensions in order to be defined as rigorously as possible.

While equations (1) and (2) have been described in connection with a preferred embodiment of the vertical difference detector 50, other equations could be used. For example, the following pair of more generic equations would also provide suitable results:

$$D_L = K_1^*L_L + K_2^*L_P - K_3^*L_N \quad (4)$$

$$D_U = K_1^*L_N + K_2^*L_P - K_3^*L_L \quad (2)$$

where $K_1 - K_2 - K_3 = 0$

The foregoing description of a luma/chroma separator is appropriate to a system for composite video according to the NTSC standard. In PAL systems, the line delays 14 and 16 shown in FIG. 2 would each have to be replaced by two line delays to produce U and V chrominance components as the output of the vertical filter 18, since in video according to the PAL standard like chrominance components with opposite signs occur two lines apart instead of one line apart as in NTSC. With this modification to the delays 14 and 16, the adaptive control circuit 20' shown in FIG. 5 will function exactly the same way as it did for NTSC.

It will be appreciated that the invention is not restricted to the particular embodiment that has been described, and that variations may be made therein without departing from the scope of the invention as defined in the appended claims and equivalents thereof. The claims that follow are therefore intended to cover all such changes and modifications as fall within the true scope of the invention.

I claim:

1. A method for producing improved adaptive control signals for a luminance and chrominance separation circuit employing adaptive filtering of a chrominance signal, the method comprising the steps of:
   detecting vertical differences from a next line signal, a present line signal, and a last line signal to produce a vertical chrominance difference signal;
   detecting horizontal differences in the present line signal to produce a horizontal chrominance difference signal; and
   subtracting the horizontal chrominance difference signal from the vertical chrominance difference signal to produce an adaptive control signal.

2. A method according to claim 1 wherein the step of detecting vertical differences comprises the steps of:
   detecting upper differences from the next line signal, the present line signal, and the last line signal to produce an upper difference signal;
   detecting lower differences from the next line signal, the present line signal, and the last line signal to produce a lower difference signal; and
   comparing the upper and lower difference signals to produce the vertical chrominance difference signal based on the contents of the upper and lower difference signals.

3. A method according to claim 2 wherein the step of detecting the lower difference comprises the step of calculating the absolute value of the sum of twice the value of the last line signal plus the value of the present line signal plus the negative value of the next line signal to produce the lower difference signal, and the step of detecting the upper differences comprises the step of calculating the absolute value of the sum of twice the value of the next line signal plus the value of the present line signal plus the negative value of the last line signal to produce the upper difference signal.

4. A method according to claim 2 wherein the step of comparing comprises the step of determining the larger of the upper difference signal and the lower difference signal to use as the vertical chrominance difference signal.

5. A method according to claim 1 wherein the step of detecting the horizontal differences comprises the step of determining the absolute value of the sum of the values of two pixels that are separated by an integral number of half cycles of a subcarrier frequency.

6. A method according to claim 1 wherein the step of subtracting further comprises the step of limiting maximum and minimum values that the adaptive control signal may assume.

7. A method according to claim 1 wherein the step of subtracting further comprises the step of scaling the horizontal chrominance difference signal or the vertical chrominance difference signal or both.

8. An apparatus for producing improved adaptive control signals for a luminance and chrominance separation circuit employing adaptive filtering of a chrominance signal, the apparatus comprising:
   vertical difference detection means receiving a next line signal, a present line signal, and a last line signal and producing a vertical chrominance difference signal;
   horizontal difference detection means receiving the present line signal and producing a horizontal chrominance difference signal; and
   subtracting means for producing an adaptive control signal based on the vertical chrominance difference signal and the horizontal chrominance difference signal.

9. An apparatus according to claim 8 wherein the vertical difference detection means comprises:
   upper difference detection means receiving the next line signal, the present line signal, and the last line signal and producing an upper difference signal;
   lower difference detection means receiving the next line signal, the present line signal, and the last line signal and producing a lower difference signal; and
   comparison means for receiving the upper and lower difference signals and producing the vertical chrominance difference signal based on the contents of the upper and lower difference signals.

10. An apparatus according to claim 9 wherein the lower difference detection means comprise means for calculating the absolute value of the sum of twice the value of the last line signal plus the value of the present line signal plus the negative value of the next line signal to produce the lower difference signal, and the upper difference detection means comprise means for calculating the absolute value of the sum of twice the value of the next line signal plus the value present line signal plus the negative of the value of the last line signal to produce the upper difference signal.

11. An apparatus according to claim 9 wherein the comparison means comprise means for determining the larger of the upper difference signal and the lower difference signal to produce the vertical chrominance difference signal.

12. An apparatus according to claim 8 wherein the horizontal difference detection means comprises means for determining the absolute value of the sum of the values of two pixels that are separated by an integral number of half cycles of a subcarrier frequency.

13. An apparatus according to claim 8 wherein the subtracting means further comprise means for limiting maximum and minimum values that the adaptive control signal may assume.

14. An apparatus according to claim 8 wherein the subtracting means further comprise means for scaling the horizontal chrominance difference signal or the vertical chrominance difference signal or both.

15. A luminance and chrominance separation circuit comprising:

a horizontal filter having a composite video signal input and producing a horizontally filtered chrominance signal output;

a vertical filter having the horizontally filtered chrominance signal as input and producing a vertically and horizontally filtered output;

a mixer having the horizontally filtered chrominance signal as a first input, the vertically and horizontally filtered chrominance signal as a second input, and an adaptive control signal as a control input, and producing a chrominance output that is a mix of the first and second inputs as determined by the control input;

a summation circuit having as an addend input the composite video signal and as a subtrahend input the chrominance output from the mixer, and producing a luminance output; and an adaptive control signal generator including:

vertical difference detection means receiving a next line signal, a present line signal, and a last line signal from the horizontal filter and producing a vertical chrominance difference signal;

horizontal difference detection means receiving the present line signal from the horizontal filter and producing a horizontal chrominance difference signal; and subtracting means for producing the adaptive control signal based on the vertical chrominance difference signal and the horizontal chrominance difference signal.

16. A luminance and chrominance separation circuit according to claim 15 wherein the vertical difference detection means comprises:

upper difference detection means receiving the next line signal, the present line signal, and the last line signal and producing an upper difference signal;

lower difference detection means receiving the next line signal, the present line signal, and the last line signal and producing a lower difference signal; and comparison means for receiving the upper and lower difference signals and producing the vertical chrominance difference signal based on the contents of the upper and lower difference signals.

17. A luminance and chrominance separation circuit according to claim 16 wherein the lower difference detection means comprise means for calculating the absolute value of the sum of twice the value of the last line signal plus the value of the present line signal plus the negative value of the next line signal to produce the lower difference signal, and the upper difference detection means comprise means for calculating the absolute value of the sum of twice the value of the next line signal plus the value of the present line signal plus the negative value of the last line signal to produce the upper difference signal.

18. A luminance and chrominance separation circuit according to claim 16 wherein the comparison means comprise means for determining the larger of the upper difference signal and the lower difference signal to produce the vertical chrominance difference signal.

19. A luminance and chrominance separation circuit according to claim 15 wherein the horizontal difference detection comprises means for determining the absolute value of the sum of the values of two pixels that are separated by an integral number of half cycles of a subcarrier frequency.

20. A luminance and chrominance separation circuit according to claim 15 wherein the subtracting means further comprise means for limiting maximum and minimum values that the adaptive control signal may assume.

21. A luminance and chrominance separation circuit according to claim 15 wherein the subtracting means further comprise means for scaling the horizontal chrominance difference signal or the vertical chrominance difference signal or both.

* * * * *